United States Patent
Matsumoto

(10) Patent No.: US 7,109,834 B2
(45) Date of Patent: Sep. 19, 2006

(54) ELECTROMAGNETIC DRIVE TYPE ACTUATOR

(75) Inventor: Kazuya Matsumoto, Kamiina-gun (JP)

(73) Assignee: Olympus Corporation, Tokyo (JP)

( * ) Notice: Subject to any disclaimer, the term of this patent is extended or adjusted under 35 U.S.C. 154(b) by 96 days.

(21) Appl. No.: 10/791,438

(22) Filed: Mar. 2, 2004

(65) Prior Publication Data

US 2004/0174237 A1 Sep. 9, 2004

(30) Foreign Application Priority Data

Apr. 3, 2003 (JP) .............................. 2003-100436

(51) Int. Cl.
*H01H 51/22* (2006.01)

(52) U.S. Cl. ........................................ 335/78; 200/181

(58) Field of Classification Search ................. 335/78; 200/181; 359/223–225, 290, 291, 298
See application file for complete search history.

(56) References Cited

U.S. PATENT DOCUMENTS

| 4,607,287 | A | 8/1986 | Endo et al. |
| 6,188,504 | B1 * | 2/2001 | Murakami et al. ........... 359/224 |
| 6,859,121 | B1 * | 2/2005 | Arima ........................... 335/78 |
| 2002/0118429 | A1 * | 8/2002 | Miyajima et al. ........... 359/224 |

FOREIGN PATENT DOCUMENTS

JP          1-35550          7/1989

* cited by examiner

*Primary Examiner*—K. Lee
*Assistant Examiner*—Bernard Rojas
(74) *Attorney, Agent, or Firm*—Scully, Scott, Murphy & Presser, P.C.

(57) ABSTRACT

An electromagnetic drive type actuator comprises a movable plate having a flat surface, a support positioned around the movable plate, an elastic member connecting the movable plate with the support, wirings extending through the support, the movable plate and the elastic member, and a magnetic field generator. The elastic member is elastically deformable and supports the movable plate so as to allow the movable plate to move in directions parallel to the flat surface of the movable plate. The wirings pass currents. The magnetic field generator generates a magnetic field in a space around the movable plate. The magnetic field has a direction orthogonal to the flat surface of the movable plate. The movable plate is moved in the directions parallel to the flat surface of the movable plate by an interaction between the currents flowing through the wirings and the magnetic field generated by magnetic field generator.

18 Claims, 5 Drawing Sheets

ELECTROMAGNETIC DRIVE TYPE ACTUATOR

CROSS-REFERENCE TO RELATED APPLICATIONS

This application is based upon and claims the benefit of priority from prior Japanese Patent Application No. 2003-100436, filed Apr. 3, 2003, the entire contents of which are incorporated herein by reference.

BACKGROUND OF THE INVENTION

1. Field of the Invention

The present invention relates to an actuator having a movable plate allowed to move, and more particularly, it relates to an actuator that displaces a movable plate in directions horizontal to a flat surface the movable plate.

2. Description of the Related Art

Jpn. Pat. Appln. KOKOKU Publication No. 1-35550 discloses a video camera aiming at an increase in resolution of an image by utilizing a piezoelectric actuator. A structure of this video camera will now be described hereinafter with reference to FIG. 11.

As shown in FIG. 11, a solid-state image sensing device chip substrate 610 is supported by two bimorph piezoelectric elements 611A and 611B fixed to a support base 612. Here, the solid-state image sensing device chip substrate 610, the bimorph piezoelectric elements 611A and 611B and the support base 612 constitute a piezoelectric actuator that displaces the solid-state image sensing device chip substrate 610 in directions horizontal to a flat surface of the chip substrate 610.

A light input is transmitted through an imaging lens 613 and image-formed on the solid-state image sensing device chip substrate 610. The bimorph piezoelectric elements 611A and 611B displace the solid-state image sensing device chip substrate 610 in directions vertical to an optical axis with a resonance frequency corresponding to a frame cycle upon receiving vibration pulses generated by a pulse driver 614, a tr, tf control circuit 615 and a trapezoidal wave generation circuit 616.

A timing generation circuit 617 generates necessary synchronization pulses such as a timing signal of a $P_H/2$ delay circuit 618 required to delay a timing of a horizontal read register by a quantity corresponding to ½ of a horizontal pixel pitch $P_H$, a timing signal of a vertical register and others. The solid-state image sensing device chip substrate 610 is driven by a clock driver 619, and an output signal obtained from the solid-state image sensing device chip substrate 610 is processed into a predetermined signal waveform through a preamplifier 620 and a process amplifier 621. A signal reproduction circuit 622 performs processing matching with a spatial sampling point based on first vibration and outputs a result.

Since a reproduced image on a monitor is displayed by adding a field A and a field B, a resolution in the horizontal direction is improved to be two times. That is, the video camera shown in FIG. 11 realizes an increase in resolution of an image by moving the imaging element in directions orthogonal to the optical axis by using the piezoelectric actuator.

The piezoelectric actuator according to the prior art utilizes a piezoelectric material. Therefore, a relationship between a drive signal (applied voltage) and a displacement quantity has hysteresis characteristics.

Further, in the video camera shown in FIG. 11, the bimorph piezoelectric elements 611A and 611B are repeatedly displaced in directions vertical to their flat surfaces in a cycle of 1/30 second or 1/60 second which is a period corresponding to ½ of one frame cycle or ½ of one field cycle. Therefore, there is a possibility that sound waves at a lower frequency involved by that displacement, i.e., vibration sounds may be generated. Since such vibration sounds become noises when recording sounds, it is desired that generation of such vibration sounds is as small as possible in an application of the video camera.

BRIEF SUMMARY OF THE INVENTION

The present invention is directed to an electromagnetic drive type actuator having good linearity in which a relationship between a displacement quantity and a drive signal does not have any hysteresis.

An electromagnetic drive type actuator according to the present invention comprises a movable plate having a flat surface, a support positioned around the movable plate, an elastic member connecting the movable plate with the support, wirings extending through the support, the movable plate and the elastic member, and a magnetic field generator. The elastic member is elastically deformable and supports the movable plate so as to allow the movable plate to move in directions parallel to the flat surface of the movable plate. The wirings pass currents. The magnetic field generator generates a magnetic field in a space around the movable plate. The magnetic field has a direction orthogonal to the flat surface of the movable plate. The movable plate is moved in the directions parallel to the flat surface of the movable plate by an interaction between the currents flowing through the wirings and the magnetic field generated by magnetic field generator.

Additional advantages of the invention will be set forth in the description which follows, and in part will be obvious from the description, or may be learned by practice of the invention. The advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

DETAILED DESCRIPTION OF THE INVENTION

Embodiments according to the present invention will now be described hereinafter with reference to the accompanying drawings.

FIRST EMBODIMENT

Figure 1:
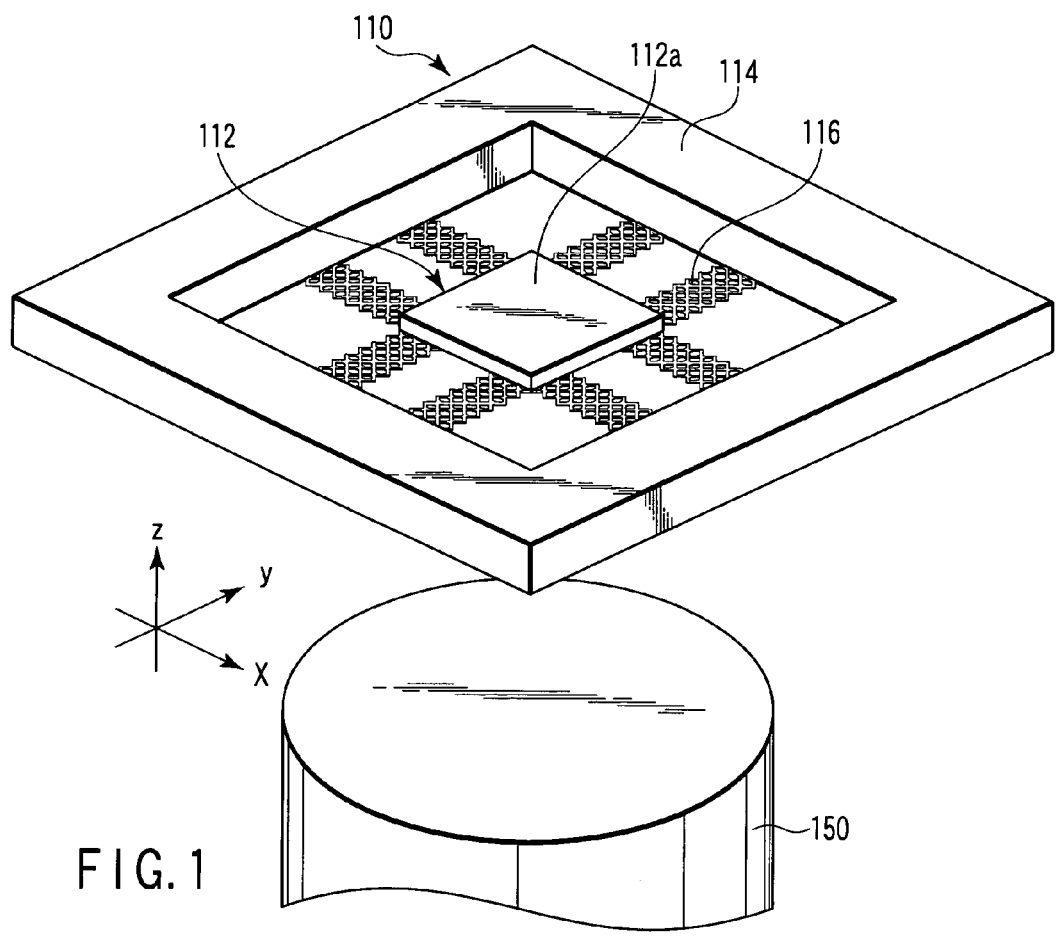
FIG. 1 is a perspective view showing an electromagnetic drive type actuator according to a first embodiment of the present invention.

FIG. 1 is a perspective view showing an electromagnetic drive type actuator according to a first embodiment of the present invention.

As shown in FIG. 1, an electromagnetic drive type actuator 100 comprises a movable plate element 110, which includes a movable plate 112 allowed to move, and a permanent magnet 150, which are arranged below the movable plate element 110.

The movable plate element 110 has the movable plate 112, a support or support frame 114 positioned around the movable plate 112, and eight springs 116, which are elastically deformable, connecting the movable plate 112 with the support frame 114 and can be elastically deformed.

The movable plate element 110 is manufactured by a micromachine manufacturing method. The support frame 114 and the movable plate 112 are formed by etching a silicon substrate. Each spring 116 is mainly formed of a polyimide film.

The movable plate 112 has a rectangular flat plate conformation, and has a flat surface 112a. The flat surface 112a of the movable plate 112 is optically utilized, for example, as a reflection surface. In such a case, a thin film of metal, such as aluminum or gold, having a high reflectance with respect to light is preferably formed on the flat surface 112a of the movable plate 112. In another example, an optical element, such as a light source or an imaging element, is mounted on the flat surface 112a of the movable plate 112.

An xyz coordinate system is set in the following description as shown in FIG. 1 for the sake of convenience. That is, the xyz coordinate system is set in such a manner that an xy plane is parallel to the flat surface 112a of the movable plate 112.

The eight springs 116 constitute an elastic member that connects the movable plate 112 with the support and is elastically deformable. That is, the elastic member comprises the four springs 116 extending along the axis x and the four springs 116 extending along the axis y. These springs 116 support the movable plate 112 so as to allow the movable plate 112 to move in directions parallel to the flat surface 112a of the movable plate 112. That is, the springs 116 support the movable plate 112 so as to allow the movable plate 112 to move along the xy plane.

The permanent magnet 150 is arranged away from the movable plate 112 in a direction that is substantially orthogonal to the flat surface 112a of the movable plate 112. This permanent magnet 150 constitutes magnetic field generating means or magnetic field generator that generates a magnetic field in a space around the movable plate 112. The magnetic field generating means or magnetic field generator is not restricted to a permanent magnet. The magnetic field generating means or magnetic field generator may comprise an electromagnet.

Figure 3:
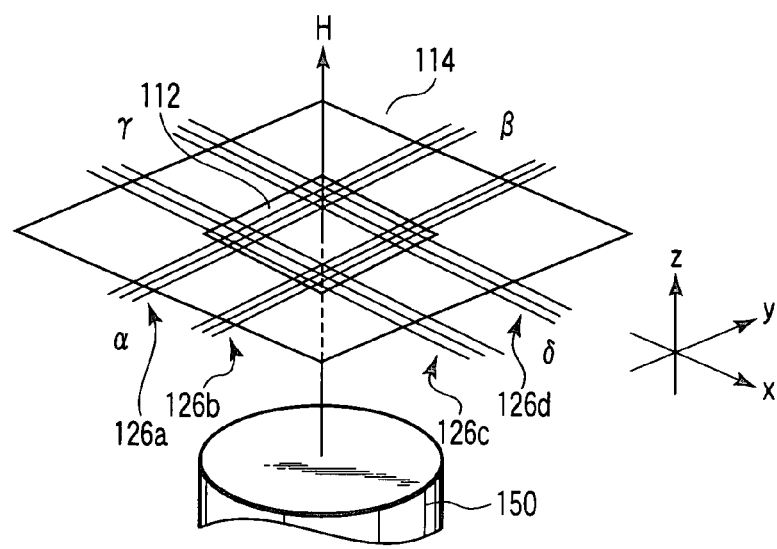
FIG. 3 schematically shows a wiring pattern of the electromagnetic drive type actuator depicted in FIG. 1 and a magnetic field.

As shown in FIG. 3, the permanent magnet 150 generates a magnetic field H orthogonal to the flat surface 112a of the movable plate 112, i.e., the xy plane. More particularly, it generates the magnetic field H having a direction of +z.

As schematically shown in FIG. 3, the movable plate element 110 further has four wiring groups 126a, 126b, 126c and 126d. The wiring groups 126a to 126d extend through the support frame 114, the movable plate 112 and the springs 116. That is, the wiring groups 126a to 126d constitute wirings, which carry currents, extending through the support (support frame 114), the movable plate 112 and the elastic member (springs 116).

The two wiring groups 126a and 126b extend along the axis y, and the two wiring groups 126b and 126d extend along the axis x. Therefore, the four wiring groups 126a to 126d all extend so as to be orthogonal to the magnetic field H. Although not shown, the wiring groups 126a and 126b are insulated from the wiring groups 126c and 126d through an insulating layer interposed between them.

Figure 2:
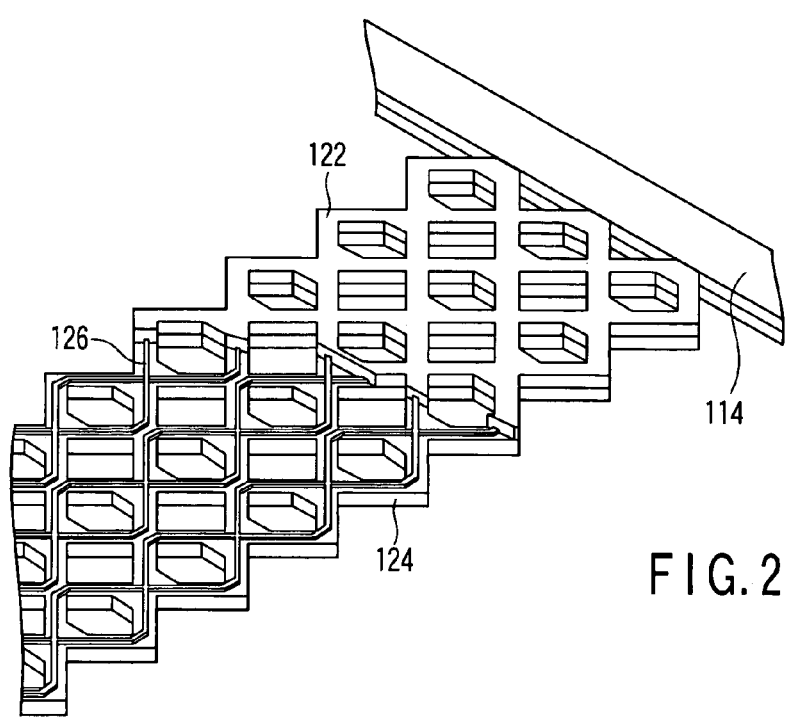
FIG. 2 is a perspective view showing a spring depicted in FIG. 1 in an enlarged manner.

As shown in FIG. 2, each spring 116 has a mesh structure. The spring 116 has two laminated polyimide thin films 122 and 124 and a wiring 126 positioned between these thin films. The characteristics of the spring 116 are mainly determined by the polyimide thin films 122 and 124.

A material of the spring may be selected from various kinds of materials, e.g., an organic insulator such as a fluorocarbon resin (brand name: Cytop manufactured by Asahi Glass Company) or a benzocyclobutene resin (brand name: Cyclotene resin manufactured by Dow Chemical), an inorganic insulator such as a silicon nitride film, a semiconductor material such as silicon, a metal thin film and others in accordance with a desired spring strength.

Each wiring 126 is an element constituting the wiring groups 126a to 126d. Although not shown, the wiring 126 is electrically connected with a pad provided to the support frame 114, and a current is supplied to the wiring 126 from a drive circuit set outside through the pad.

In FIG. 3, the electromagnetic drive type actuator 100 is driven by passing the current to any of the four wiring groups 126a to 126d.

When the currents are caused to flow though the wiring group 126a and wiring group 126b in a direction from α to β, i.e., a direction of +y, both the currents flowing through the wiring group 126a and wiring group 126b generate a Lorentz force in a direction of +x by the interaction with the magnetic field H. Therefore, the movable plate 112 moves in the direction of +x upon receiving the Lorentz force in the direction of +x, and stands still at a position where it balances with the resilience of the springs 116. That is, the movable plate 112 is displaced in the direction of +x.

On the contrary, when the currents are caused to flow through the wiring group 126a and wiring group 126b in a direction from β to α, i.e., a direction of −y, the movable plate 112 moves in a direction of −x upon receiving the Lorentz force in the direction of −x, and stands still at a position where it balances with the resilience of the springs 116. That is, the movable plate 112 is displaced in the direction of −x.

The magnetic field H is generated by using the permanent magnet 150, so that its direction and intensity are fixed. Therefore, a direction of the Lorentz force received by the movable plate 112 is determined by the directions of the currents flowing through the wiring group 126a and wiring group 126b. Further, the intensity of the Lorentz force received by the movable plate 112 is determined by intensities of the currents flowing through the wiring group 126a and wiring group 126b.

Therefore, a direction of displacement of the movable plate 112 can be controlled by controlling the directions of the currents flowing through the wiring group 126a and wiring group 126b, and a magnitude of displacement of the movable plate 112 can be controlled by controlling the intensities of the currents flowing through the wiring group 126a and wiring group 126b.

That is, the movable plate 112 can be displaced by a desired distance along the axis x by controlling the directions and the intensities of the currents flowing through the wiring group 126a and wiring group 126b.

Furthermore, when the currents are caused to flow through the wiring group 126c and wiring group 126d, the movable plate 112 moves along the axis y upon receiving the Lorentz force in a direction parallel to the axis y and stands still at a position where it balances with the resilience of the springs 116 for the same reason. The direction and the intensity of the Lorentz force received by the movable plate 112 are determined by the directions and the intensities of the currents flowing through the wiring group 126c and wiring group 126d. Therefore, the movable plate 112 can be displaced by a desired distance along the axis y by controlling the directions and the intensities of the currents flowing through the wiring group 126c and wiring group 126d.

Therefore, the movable plate 112 can be displaced by a desired distance in parallel to the xy plane by passing the currents to an appropriate group or groups in the four wiring groups 126a to 126d while controlling the directions and intensities thereof.

As described above, the magnetic field generating means or magnetic field generator may comprise an electromagnet. When the magnetic field generating means or magnetic field generator comprises an electromagnet, a direction and an intensity of a magnetic field to be generated can be changed by varying a direction and an intensity of a current caused to flow through the electromagnet. Therefore, the movable plate 112 can be displaced by a desired distance along the axis x by passing fixed currents to the wiring group 126a and wiring group 126b and changing a direction and an intensity of a current caused to flow through the electromagnet. Moreover, the movable plate 112 can be displaced by a desired distance along the axis y by passing fixed currents to the wiring group 126c and wiring group 126d and changing a direction and an intensity of a current caused to flow though the electromagnet.

Since the electromagnetic drive mode is adopted for the electromagnetic drive actuator according to this embodiment, a relationship between a displacement quantity of the movable plate and a drive current does not have any hysteresis but has good linearity. Therefore, a displacement quantity can be controlled by using a simple drive method or signal processing. Since an electrostatic drive mode is not employed, a sticking phenomenon does not naturally occur. Therefore, an undesired reduction in drive efficiency is not provoked when the movable plate is largely displaced.

Various modifications or changes may be made to respective elements according to this embodiment.

Figure 4:
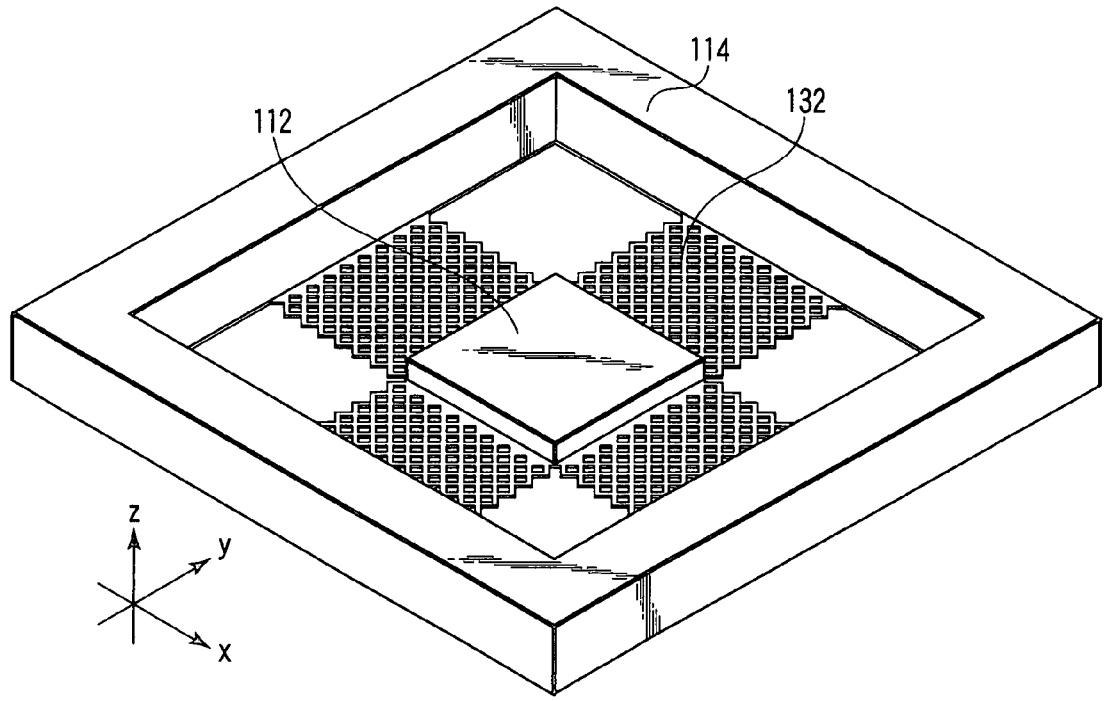
FIG. 4 shows a modification of a movable plate element, which can substitute for a movable plate element depicted in FIG. 1.
Figure 5:
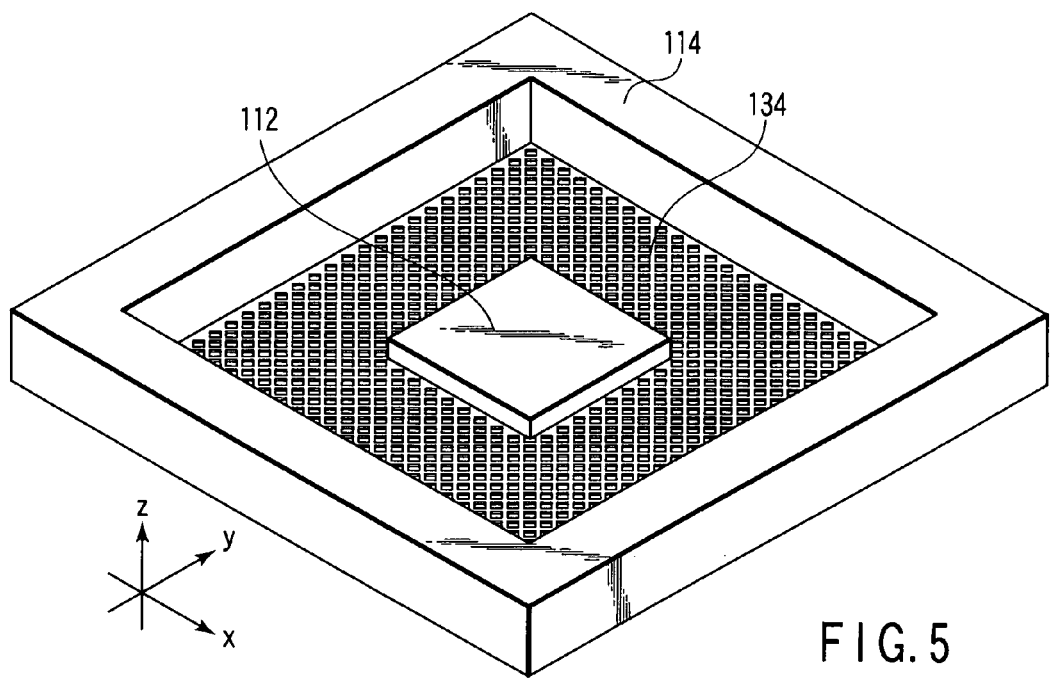
FIG. 5 shows another modification of the movable plate element, which can substrate for the movable plate element depicted in FIG. 1.

For example, in the movable plate element 110 shown in FIG. 1, although the elastic member connecting the movable plate 112 with the support (support frame 114) comprises a total of eight springs 116, i.e., the four springs 116 extending along the axis x and the four springs 116 extending along the axis y, it may comprise a total of four springs 132, i.e., two wide springs 132 extending along the axis x and two wide springs 132 extending along the axis y as shown in FIG. 4. Additionally, the elastic member may comprise a single spring 134 spread in an entire space between the movable plate 112 and the support frame 114 as shown in FIG. 5. The springs 132 and the spring 134 having such conformations are effective to compensate the spring strength when the spring strength of the springs 116 having the conformation shown in FIG. 1 is insufficient.

Figure 6:
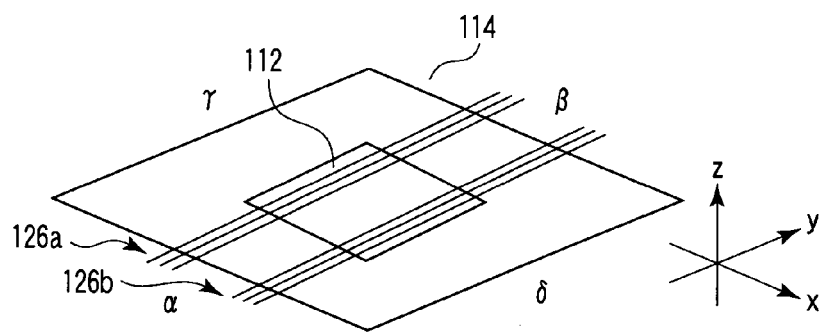
FIG. 6 shows a modification of a wiring pattern, which can substitute for the wiring pattern depicted in FIG. 3.

Further, in the electromagnetic drive type actuator 100, the wirings extending through the support (support frame 114), movable plate 112, and elastic member (springs 116) comprise the four wiring groups 126a to 126d as shown in FIG. 3. However, when a necessary displacement of the movable plate 112 is one dimension, for example, for an application that requires the movable plate 112 only to displace along the axis x, the wirings may comprise only the two wiring groups 126a and 126b extending along an axis, i.e., the axis y, as shown in FIG. 6. The movable plate 112 is displaced by a desired distance along the axis x by controlling directions and intensities of currents caused to flow though the wiring groups 126a and 126b.

In this modification, since the spring extending along the axis x does not include the wirings, it is softer than the spring including the wirings corresponding to FIG. 3. Thus, the movable plate 112 can be largely displaced by using the current having the same intensity. Furthermore, the spring extending along the axis x may be eliminated. That is, the elastic member connecting the movable plate 112 with the support frame 114 may comprise a plurality of springs extending along an axis, i.e., the axis y.

Figure 7:
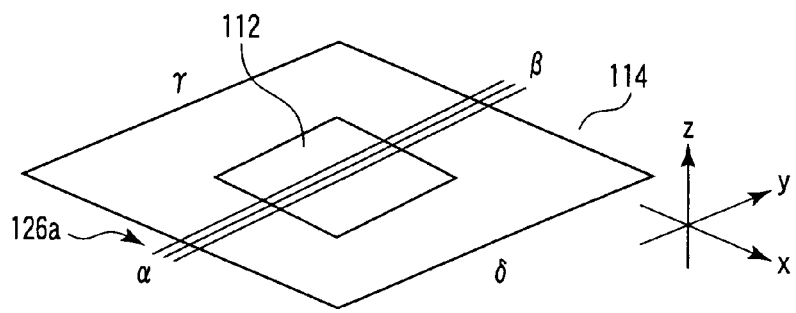
FIG. 7 shows another modification of the wiring pattern, which can substitute for the wiring pattern depicted in FIG. 3.

Moreover, as shown in FIG. 7, the wirings may comprise only one wiring group 126a extending along one axis, i.e., the axis y. In accordance with this, the elastic member of the movable plate element 110 comprises the springs having the conformation shown in FIG. 4 or FIG. 5. The movable plate 112 is displaced by a desired distance along the axis x by controlling the direction and the intensity of the current caused to flow through the wiring group 126a.

In this modification, since the spring extending along the axis x does not include the wirings, it is softer than the spring including the wirings corresponding to FIG. 3. Thus, the movable plate 112 can be largely displaced by using the current having the same intensity. Additionally, the spring extending along the axis x may be eliminated. That is, the elastic member connecting the movable plate 112 with the support frame 114 may comprise a plurality of springs extending along an axis, i.e., the axis y.

The electromagnetic drive type actuator according to this embodiment may be driven by using direct-current electricity (i.e., in a DC mode) or driven by using alternating current (i.e., in an AC mode). In particular, when the actuator is driven in the AC mode, it is sufficient to match a resonance mode of a translational movement of the springs corresponding with an operating frequency of a translational movement (movement in directions parallel to the flat surface of the movable plate) of the movable plate based on a spring material or a spring dimension. As a result, it is possible to realize an improvement in drive efficiency, in other words, a reduction in power consumption.

SECOND EMBODIMENT

Figure 8:
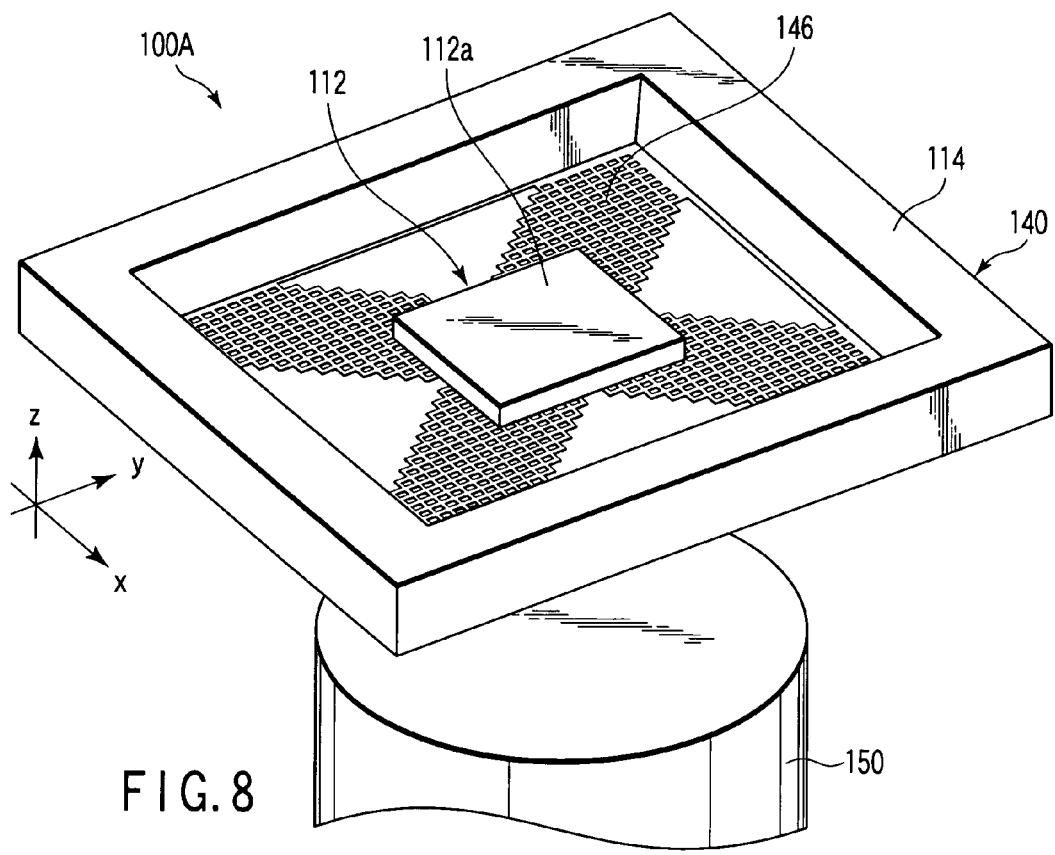
FIG. 8 is a perspective view showing an electromagnetic drive type actuator according to a second embodiment of the present invention.

FIG. 8 is a perspective view showing an electromagnetic drive type actuator according to the second embodiment of the present invention. In FIG. 8, like reference numerals denote parts equal to those in FIG. 1, thereby eliminating their detailed explanation.

As shown in FIG. 8, an electromagnetic drive type actuator 101A comprises a movable plate element 140, which includes a movable plate 112 allowed to move, and a permanent magnet 150, which are arranged below the movable plate element 140.

The movable plate element 140 has the movable plate 112, a support frame 114 positioned around the movable plate 112, and four springs 146, which are elastically deformable, connecting the movable plate 112 with the support frame 114.

The four springs 146 constitute an elastically deformable elastic member connecting the movable plate 112 with a support (support frame 114). The elastic member comprises two springs 146 extending along an axis not parallel to the axis x and two springs 146 extending along another axis not parallel to the axis x. More particularly, the elastic member comprises the two springs 146 extending in a direction forming an angle of +45° with respect to the axis x and the two springs 146 extending in a direction forming an angle of −45° with respect to the axis x.

These springs 146 support the movable plate 112 so as to allow the movable plate 112 to move in directions parallel to a flat surface 112a of the movable plate 112. That is, the springs 146 support the movable plate 112 so as to allow the movable plate 112 to move along an xy plane.

Figure 9:
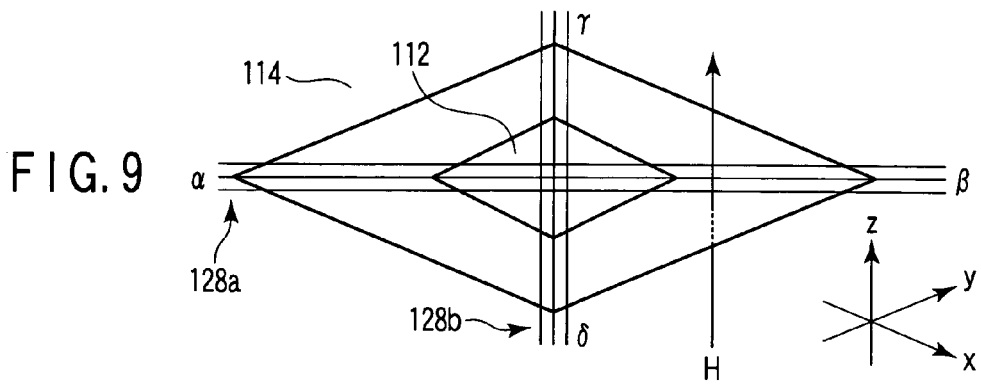
FIG. 9 schematically shows a wiring pattern of the electromagnetic drive type actuator depicted in FIG. 8 and a magnetic field.

As schematically shown in FIG. 9, the movable plate element 140 further has two wiring groups 128a and 128b. The wiring groups 128a and 128b extend through the support frame 114, the movable plate 112 and the springs 146. That is, the wiring groups 128a and 128b constitute wirings, which carry currents, extending through the support (support frame 114), movable plate 112, and elastic member (springs 146).

The two wiring groups 128a and 128b extend along diagonal lines of the movable plate 112. More particularly, the wiring group 128a extends in a direction forming an angle of −45° with respect to the axis x, and the wiring group 128b extends in a direction forming an angle of +45° with respect to the axis x.

The electromagnetic drive type actuator 100A is driven by causing currents to appropriately flow through the wiring groups 128a and wiring group 128b.

When the currents are caused to flow through the wiring group 128a in a direction from α to β, the movable plate 112 moves in a direction from γ to δ upon receiving a Lorentz force in the direction from γ to δ, and stands still at a position where it balances with a resilience of the springs 146.

On the contrary, when currents are caused to flow through the wiring group 128a in a direction from β to α, the movable plate 112 moves in a direction from δ to γ upon receiving the Lorentz force in the direction from δ to γ, and stands still at a position where it balances with the resilience of the springs 146.

A direction and an intensity of the Lorentz force received by the movable plate 112 are determined by a direction and an intensity of the current flowing through the wiring group 128a for the same reason as that in the first embodiment. Therefore, the movable plate 112 can be displaced by a desired distance in the direction from γ to δ by controlling the direction and the intensity of the current caused to flow through the wiring group 128a.

Furthermore, when the current is caused to flow through the wiring group 128b in the direction from γ to δ, the movable plate 112 moves in the direction from β to α upon receiving the Lorentz force in the direction from β to α, and stands still at a position where it balances with the resilience of the springs 146. On the contrary, when the current is caused to flow though the wiring group 128b in the direction from δ to γ, the movable plate 112 moves in the direction from α to β upon receiving the Lorentz force in the direction from α to β, and stands still at a position where it balances with the resilience of the springs 146.

A direction and an intensity of the Lorentz force received by the movable plate 112 are determined by a direction and an intensity of the current flowing through the wiring group 128b. Therefore, the movable plate 112 can be displaced by a desired distance in the direction from α to β by controlling the direction and the intensity of the current caused to flow through the wiring group 128b.

Therefore, the movable plate 112 can be displaced by a desired distance in parallel to the xy plane by causing the current to flow through one or both of the wiring groups 128a and 128b while controlling the direction and the intensity of the current.

The magnetic field generating means or magnetic field generator may comprise an electromagnet in place of the permanent magnet. When the magnetic field generating means or magnetic field generator comprises the electromagnet, a direction and an intensity of a magnetic field to be generated can be changed by varying a direction and an intensity of a current which is caused to flow through the electromagnet. Therefore, the movable plate 112 can be displaced by a desired distance in a direction from γ to δ by passing a fixed current to the wiring group 128a and changing a direction and an intensity of a current caused to flow through the electromagnet. Further, the movable plate 112 can be displaced by a desired distance in a direction from α to β by passing a fixed current to the wiring group 128b and changing a direction and an intensity of a current caused to flow through the electromagnet.

Since the electromagnetic drive mode is adopted for the electromagnetic drive type actuator according to this embodiment, a relationship between a displacement quantity of the movable plate and a drive current does not have any hysteresis but has good linearity. Therefore, a displacement quantity can be excellently controlled by a simple drive method or signal processing. Since an electrostatic drive mode is not adopted, a sticking phenomenon does not naturally occur. Therefore, an undesired reduction in drive efficiency is not provoked when the movable plate is largely displaced.

In this embodiment, since the wiring group 128a and wiring group 128b extend in diagonal directions of the movable plate 112, a dimension of the movable plate element becomes small when the wirings in the springs have the same length as compared with the first embodiment.

A wide variety of modifications or changes can be carried out with respect to various elements in this embodiment.

Figure 10:
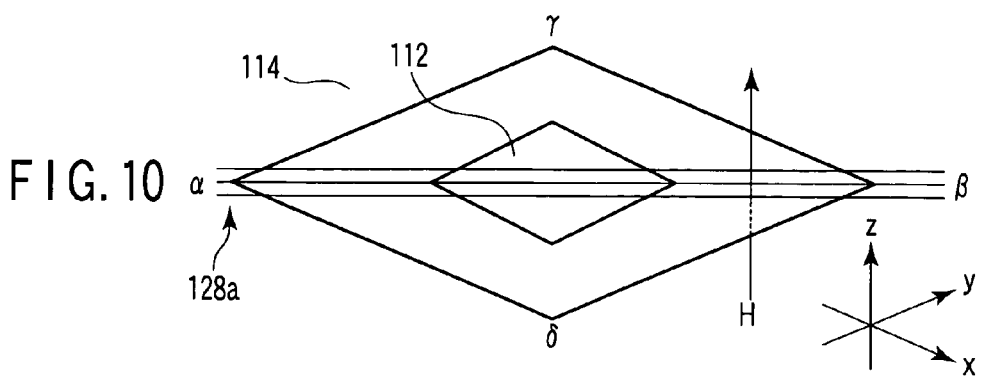
FIG. 10 shows a modification of a movable plate element, which can substitute for a movable plate element depicted in FIG. 9.
Figure 11:
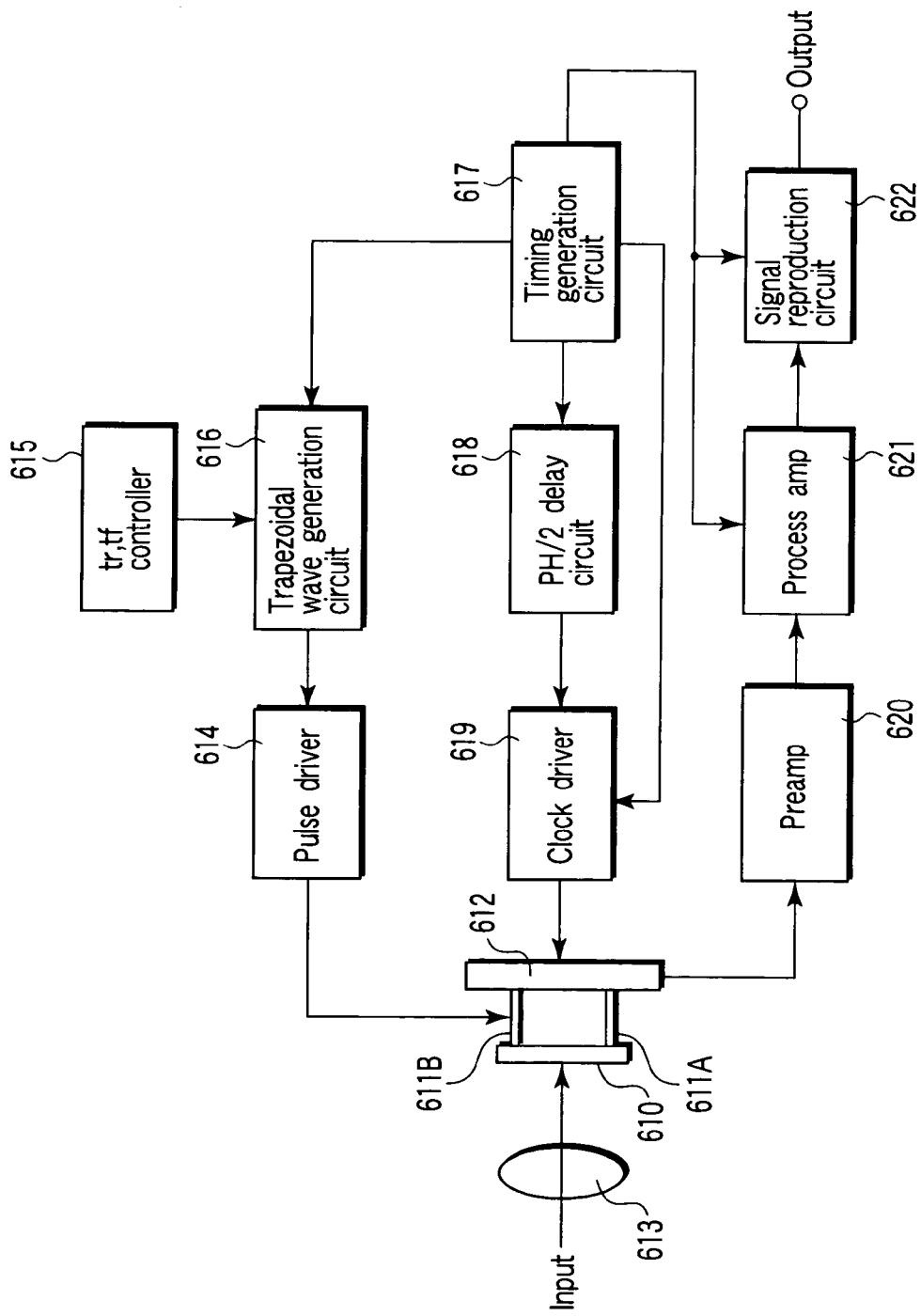
FIG. 11 shows a structure of a conventional example of a video camera aiming at an increase in resolution of an image by using a piezoelectric actuator.

For example, when it is sufficient for the movable plate 112 to displace in the direction from γ to δ, the wirings, which extend through the support (support frame 114), the movable plate 112 and the elastic member (springs 146) and carry currents, may comprise only one wiring group 128a which extends along an axis or in a direction from α to β as shown in FIG. 10. The movable plate 112 is displaced by a desired distance in a direction from γ to δ by controlling a direction and an intensity of a current caused to flow through the wiring group 128a.

In this modification, since the spring extending in the direction from γ to δ does not include the wirings, it is softer than the springs including the wirings corresponding to FIG. 9. Accordingly, the movable plate 112 can be largely displaced by using a current having the same intensity. Furthermore, the spring extending extends from the direction from γ to δ may be eliminated. That is, the elastic member, which connects the movable plate 112 with the support frame 114, may comprise two springs extending along an axis or in a direction from α to β.

The electromagnetic drive type actuator according to this embodiment may be driven by using direct-current electricity (i.e., in a DC mode) or by using alternating current (i.e., in an AC mode). When driven in the AC mode in particular, it is sufficient to match a resonance mode of a transformational movement of the springs corresponding with an operating frequency of a translational movement (movement in directions parallel to the flat surface of the movable plate) of the movable plate based on a spring material or a spring dimension. As a result, it is possible to realize an improvement in drive efficiency, in other words, a reduction in power consumption.

Application to Video Cameras

The electromagnetic drive type actuators according to the first embodiment and the second embodiment can be applied to various intended uses. For example, by mounting an imaging element on the movable plate 112, a new mechanism, e.g., for a video camera, that displaces the imaging element in parallel to an imaging plane can be provided.

This mechanism realizes an increase in resolution of an image since the imaging element can be also moved in directions orthogonal to an optical axis. That is, one frame is divided into a plurality of fields, the imaging element is moved in directions orthogonal to the optical axis in accordance with each field in order to obtain image data, and one frame is constituted by combining image data of the respective fields, thereby acquiring an image with a high resolution.

At this time, since the movable plate 112 is displaced substantially in parallel to the flat surface 112a, occurrence of vibration sounds is small, or vibration sounds do not occur at all. Therefore, this mechanism can be preferably applied to a video camera in which occurrence of vibration sounds is undesirable.

Moreover, this mechanism can be utilized for not only increasing a resolution but also prevention of a hand movement when using the camera by controlling and feeding back vibrations of the camera to the actuator.

Although the above has described the embodiments according to the present invention with reference to the drawings, the present invention is not restricted to these embodiments, and various modifications or changes can be carried out without departing from the scope of the invention.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general invention concept as defined by the appended claims and their equivalents.

What is claimed is:

1. An electromagnetic drive type actuator comprising:
a movable plate having a flat surface;
a support positioned around the movable plate;
an elastic member, which is elastically deformable, connecting the movable plate with the support, the elastic member supporting the movable plate so as to allow the movable plate to move in directions parallel to the flat surface of the movable plate;
wirings, which carry currents, extending through the support, the movable plate and the elastic member, in which parallel wirings receive currents applied in the same direction; and
magnetic field generating means for generating a magnetic field in a space around the movable plate, the magnetic field having a direction orthogonal to the flat surface of the movable plate, so that the movable plate is moved in the directions parallel to the flat surface of the movable plate by an interaction between the currents flowing through the wirings and the magnetic field generated by the magnetic field generating means.

2. The electromagnetic drive type actuator according to claim 1, wherein the elastic member has a mesh structure.

3. The electromagnetic drive type actuator according to claim 1, wherein the elastic member comprises parts extending in two directions, which are not parallel to each other.

4. The electromagnetic drive type actuator according to claim 3, wherein the two non-parallel directions, along which the parts constituting the elastic member extend, are orthogonal to each other, the wirings comprise parts extending along two directions, which are orthogonal to each other.

5. The electromagnetic drive type actuator according to claim 4, wherein the magnetic field has a direction that is substantially orthogonal to the flat surface of the movable plate.

6. The electromagnetic drive type actuator according to claim 5, wherein the magnetic field generating means comprises a permanent magnet arranged in a direction that is substantially orthogonal to the flat surface of the movable plate.

7. The electromagnetic drive type actuator according to claim 5, wherein the magnetic field generating means comprises an electromagnet.

8. The electromagnetic drive type actuator according to claim 1, wherein the elastic member comprises parts extending in a direction.

9. The electromagnetic drive type actuator according to claim 8, wherein the magnetic field has a direction that is substantially orthogonal to the flat surface of the movable plate.

10. The electromagnetic drive type actuator according to claim 9, wherein the magnetic field generating means comprises a permanent magnet arranged in a direction that is substantially orthogonal to the flat surface of the movable plate.

11. The electromagnetic drive type actuator according to claim 9, wherein the magnetic field generating means comprises an electromagnet.

12. An electromagnetic drive type actuator comprising:
a movable plate having a flat surface;
a support positioned around the movable plate;
an elastic member, which is elastically deformable, connecting the movable plate with the support, the elastic member supporting the movable plate so as to allow the movable plate to move in directions parallel to the flat surface of the movable plate;

wirings, which carry currents, extending through the support, the movable plate and the elastic member, in which parallel wirings receive currents applied in the same direction; and a magnetic field generator, which generates a magnetic field in a space around the movable plate, the magnetic field having a direction orthogonal to the flat surface of the movable plate, so that the movable plate is moved in the directions parallel to the flat surface of the movable plate by an interaction between the currents flowing through the wirings and the magnetic field generated by the magnetic field generator.

13. The electromagnetic drive type actuator according to claim 12, wherein the elastic member has a mesh structure.

14. The electromagnetic drive type actuator according to claim 12, wherein the elastic member comprises parts extending in two directions, which are not parallel to each other.

15. The electromagnetic drive type actuator according to claim 14, wherein the two non-parallel directions, along which the parts constituting the elastic member extend, are orthogonal to each other, the wirings comprise parts extending along two directions, which are orthogonal to each other.

16. The electromagnetic drive type actuator according claim 15, wherein the magnetic field has a direction that is substantially orthogonal to the flat surface of the movable plate.

17. The electromagnetic drive type actuator according to claim 12, wherein the elastic member comprises parts extending in a direction.

18. The electromagnetic drive type actuator according to claim 17, wherein the magnetic field has a direction that is substantially orthogonal to the flat surface of the movable plate.

* * * * *